United States Patent [19]
Rice

[11] Patent Number: 5,946,130
[45] Date of Patent: Aug. 31, 1999

[54] OPTICAL FIBER AMPLIFIER NETWORK HAVING A COHERENTLY COMBINED OUTPUT AND HIGH-POWER LASER AMPLIFIER CONTAINING SAME

[75] Inventor: Robert R. Rice, Chesterfield, Mo.

[73] Assignee: McDonnell Douglas Corporation, St. Louis, Mo.

[21] Appl. No.: 08/949,326

[22] Filed: Oct. 3, 1997

[51] Int. Cl.[6] ............................ H01S 3/00; H01S 3/30; G02B 5/30
[52] U.S. Cl. ..................... 359/349; 359/161; 359/341; 359/346
[58] Field of Search ................... 359/133, 134, 359/160, 161, 183, 187, 341, 347, 349; 385/3

[56] References Cited

U.S. PATENT DOCUMENTS

| | | | |
|---|---|---|---|
| 5,303,314 | 4/1994 | Dulling et al. | 385/11 |
| 5,374,935 | 12/1994 | Forrest | 342/36 |
| 5,694,408 | 12/1997 | Bolt et al. | 372/6 |
| 5,790,721 | 6/1998 | Lee | 385/11 |

OTHER PUBLICATIONS

Profst et al, Proc. of SPIE, vol. 1417, pp. 346–359; abst. only herewith, Jan. 22, 1991.
Profst et al, Proc. of SPIE, vol. 1218, pp. 285–299; abst. only herewith, Jan. 17, 1990.
Babinlau et al, 1996 Canadian Conp. an Elect. abst. only herewith, May 29, 1996.

*Primary Examiner*—Nelson Moskowitz
*Attorney, Agent, or Firm*—Westerlund & Powell, P.C.; Raymond H.J. Powell, Jr.

[57] ABSTRACT

An optical fiber amplifier which receives a primary laser beam and generates a coherent amplified laser beam, includes an optical isolator which transmits the primary laser, a 3-dB coupler which receives the primary laser beam, which generates first and second laser beams, which receives first and second amplified laser beams, and which combines the amplified laser beams to thereby produce the coherent amplified laser beam, a phase controller operatively connected in parallel with the 3-dB coupler which controls the phase of each of the amplified laser beams, and first and second fiber amplifiers operatively connected to the 3-dB coupler, the fiber amplifiers receiving first and second laser beams and generating the amplified laser beams, respectively. A high power coherent laser amplifier utilizing several optical fiber amplifier networks connected to one another in parallel is also described.

25 Claims, 5 Drawing Sheets

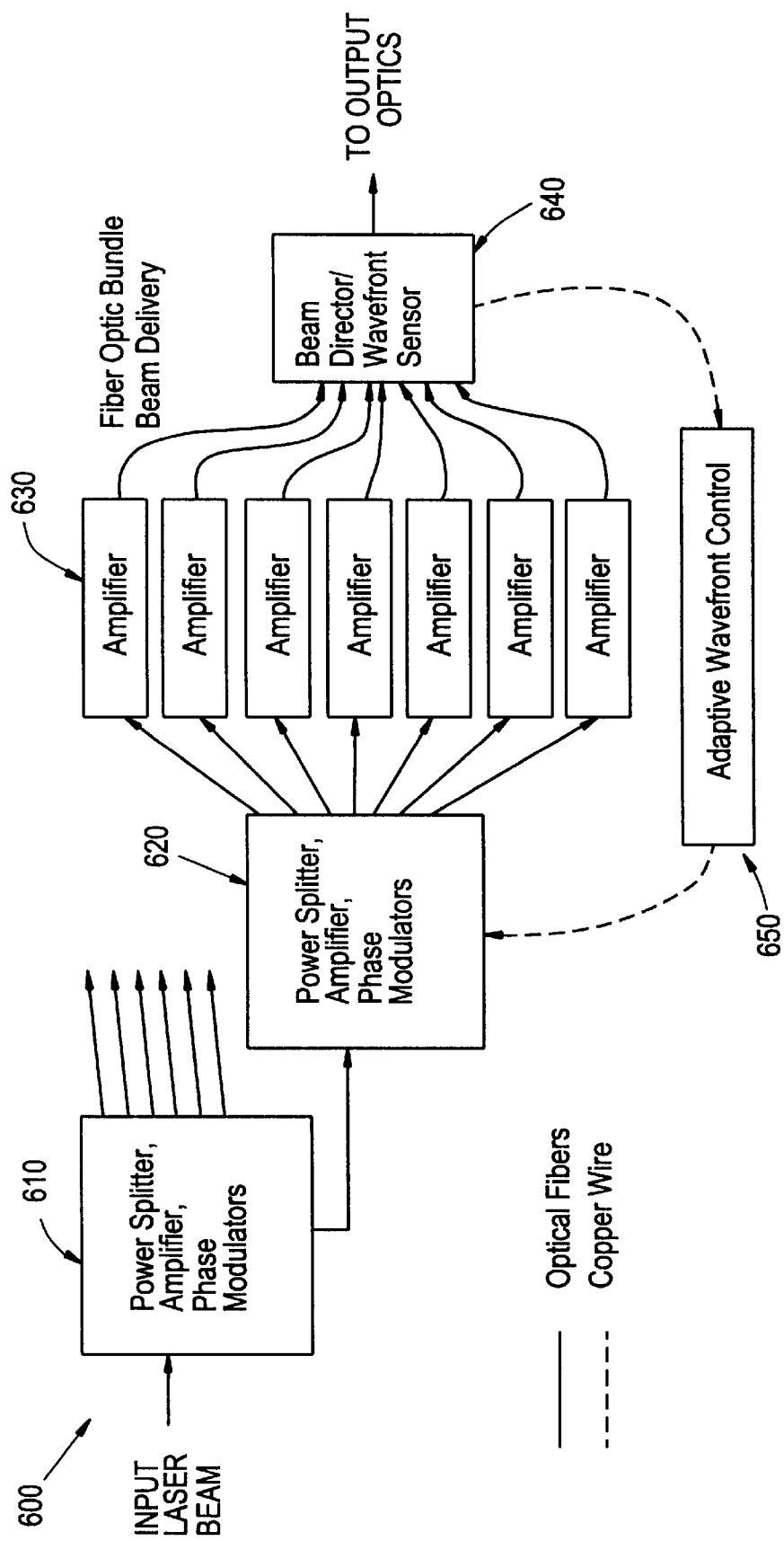

OPTICAL FIBER AMPLIFIER NETWORK HAVING A COHERENTLY COMBINED OUTPUT AND HIGH-POWER LASER AMPLIFIER CONTAINING SAME

BACKGROUND OF THE INVENTION

The present invention relates generally to optical fiber amplifiers. More specifically, the present invention relates to a network of fiber amplifiers having a coherently combined output. Advantageously, high-power laser amplifiers can be fabricated by employing a plurality of these fiber amplifier networks.

In numerous applications such as laser tracking, laser guidance and laser imaging, it is desirable to produce a high power coherent output laser beam. Moreover, high power coherent laser systems find applications in such diverse fields as offensive and defensive weapon systems, e.g., non-visible light illuminators for special operation forces and protective laser grids, as well as material processing, e.g., welding, cutting, heat treating and ablating, and medicine, e.g., surgical and diagnostic aides. In short, there are multiple military and commercial applications for high power fundamental mode laser sources. Fiber optic amplifiers have generated single mode signal powers in the 10–20 watt range; fiber optic amplifiers have not yet demonstrated output signal power in the 50–100 watts (or greater) range.

In the earliest laser systems, single semiconductor lasers were utilized to provide a coherent source of laser output. These single semiconductor lasers were limited in the amount of power which they could provide due to their structural limitations and limited efficiency. Subsequently, arrays of semiconductor lasers have been utilized in which adjacent emitters of the array of semiconductor lasers spaced upon the same substrate are coupled together. One such laser array system was disclosed in commonly assigned U.S. Pat. No. 5,212,707 to Heidel et al., which patent is incorporated herein by reference for all purposes.

A two-dimensional semiconductor laser array can be fabricated from a plurality of the one-dimensional semiconductor laser arrays by the simple expedient of stacking the one-dimensional semiconductor laser arrays within a heatsink which serves as a holding or clamping fixture. It will be appreciated that the clamping fixture can be designed such that the one-dimensional semiconductor laser arrays may be stacked on top of one another so that the outputs of each one-dimensional semiconductor laser array are substantially parallel to the outputs of the other semiconductor laser arrays. This two-dimensional laser array, when properly supplied with power, produces a single collimated spot of laser output in the far field. By utilizing a plurality of one-dimensional semiconductor laser arrays whose outputs may be combined, the output power of the two-dimensional semiconductor laser array may be quite high. For example, 25 watts of continuous wave laser energy was produced by a two-dimensional semiconductor laser array consisting of twelve one-dimensional semiconductor laser arrays with each one-dimensional semiconductor laser array having twenty-one emitters. Additionally, the overall efficiency of the laser array from electrical input to power in the central lobe was approximately 26%.

U.S. Pat. No. 5,299,222 discloses an alternative approach to producing a high power laser diode system that collects and concentrates laser output from a stack of diode laser bars in a form that is most useful for pumping a laser, e.g., a solid state laser. As described in U.S. Pat. No. 5,299,222, the light beam output of stacked diode laser bars is coupled into a plurality of optical fibers. The output light beams from the fibers may be used to pump a laser resonator. The fibers can be grouped at various end points of a solid-state laser cavity for efficient end-pumping. It will be appreciated that expansion of the systems discussed immediately above would require both a large amount of real estate and complex optic assemblies to couple the outputs of a plurality of the disclosed output modules to a single spot.

More recently, fiber optic power amplifiers have been employed to produce a high-power output signal. A single fiber power amplifier will suffice for some low power applications. However, a coherent array of optical fiber amplifiers collectively forming the fiber optic power amplifier can be employed in those specific applications when higher power output laser beams are required. One example of a coherent phased array of fiber optic amplifiers suitable for use in the present invention for generating high-power laser beams needed for long range ladar system applications is shown in FIG. 4. This particular laser power amplifier is described in detail in copending, commonly assigned U.S. patent application Ser. Nos. 08/471,870 and 08/611,474, which applications are incorporated herein by reference for all purposes. It will be appreciated that the power splitter, amplifier and phase modulator elements in FIG. 4 may be arranged in various configurations other than the exemplary arrangement illustrated in that Figure.

The fiber optic power amplifier 600 illustrated in FIG. 4 includes a first stage composed of a first beam splitter element 610, for splitting a received laser beam into a number N of secondary laser beams. Each of the secondary laser beams is provided to a second beam splitter element 620, which produces a number M of tertiary laser beams from a respective one of the secondary laser beams. Each of the tertiary laser beams is amplified by a respective fiber amplifier generally denoted 630. It will be appreciated that although two separate stages of beam splitter elements 610, 620 and one amplifier stage 630 are depicted in FIG. 4, the fiber optic power amplifier 600 can have more of less amplification stages. For example, when the first and second beam splitter elements 610, 620 include an optical amplifier 16 pumped by a pump source 18, a beam splitter 24 and, optionally, a number N×M phase modulators, respectively, a total of three amplification devices are included in the power amplifier 600. See FIG. 5a.

Alternative configurations are also possible. For example, the number of series connected elements, i.e., 610, 620 can be any number greater than or equal to 2. Moreover, it should be mentioned that the beam splitter construction is not limited to the arrangement illustrated in FIG. 5a. For example, the first stage element 610 need not include either an amplifier 16 or a phase modulator 27 (Fig. 5b); alternatively, the first stage element 610 may include optical amplifier 16 but omit phase modulator 27 (FIG. 5c). Needless to say, additional amplifier stages can be provided.

It will be noted that the fiber optic power amplifier 600 includes a phase modulator 27 in each optical path terminating at an output device. It will be appreciated that the phase modulators are provided to ensure that all of the N×M laser beams output by power amplifier 600 arrive at the output device, e.g., a lens, with a predetermined phase profile to minimize the losses produced in output device. The power amplifier 600 of FIG. 4 includes a waveform sensor 640 in the output optical path, wherein the sensor signals are provided to phase modulators 27 in elements 610, 620 via an adaptive waveform controller 650. Examples of the construction and operation of waveform sensor 640 and waveform controller 650 are provided in above-referenced copending, commonly assigned U.S. patent application Ser. Nos. 08/471,870 and 08/611,474.

Although not explicitly illustrated in FIGS. 5a–5c, it will be appreciated that the end pumped, single pass fiber optic amplifiers employed in fabricating the laser amplifier are constructed using lossy elements such as dichroic coupling elements to facilitate admission of the laser signal to be amplified and the pump beam at the same end of the optic fiber amplifier section.

What is needed is an optical fiber amplifier network allowing signals from many low power amplifiers to be coherently combined on a single optical fiber. Moreover, what is needed is an optical fiber amplifier network which minimizes the number of lossy elements employed in the network. Furthermore, an optical fiber amplifier network which can easily be scaled up to any required power level would be extremely desirable, particularly when the optical fiber amplifier network can be employed as a discrete module in a high-power laser amplifier. Lastly, an optical fiber amplifier network which mitigates problems with nonlinear parasitic effects that plague a single fiber amplifier of equivalent overall power would be particularly advantageous.

SUMMARY OF THE INVENTION

Based on the above and foregoing, it can be appreciated that there presently exists a need in the art for a high power optical fiber amplifier network producing a coherent output laser beam which overcomes the above-described deficiencies. The present invention was motivated by a desire to overcome the drawbacks and shortcomings of the presently available technology, and thereby fulfill this need in the art.

The present invention is an optical fiber amplifier network which coherently combines the output of a multiplicity of lower power fiber amplifiers on a single output optical fiber. Advantageously, the optical fiber amplifier network according to the present invention will also mitigate problems with nonlinear parasitic effects that routinely plagues a single fiber amplifier of equivalent overall power.

One object of the present invention is to provide an optical fiber amplifier network wherein the outputs of a plurality of optical fiber amplifiers are coherently combined. The optical fiber amplifier network according to the present invention has the benefit of relative simplicity and freedom from nonlinear parasitics. However, it must be mentioned that the optical fiber amplifier network according to the present invention will be limited in ultimate output power achievable to that power which a single fiber can transmit.

Another object according to the present invention is to produce an optical fiber amplifier network having a coherent output laser beam wherein the optical fiber amplifier network is both robust and relatively simple.

Still another object according to the present invention is provide an optical fiber amplifier network permitting rapid and parallel phase adjustments between amplifier elements to thereby enable coherent combining of the individual output signals.

Yet another object according to the present invention is to provide an optical fiber amplifier network fabricated from fiber amplifiers which are readily end pumped in a simple geometrical configuration.

Another object according to the present invention is to provide an optical fiber amplifier network which is relatively insensitive to nonlinear parasitic effects. According to one aspect of the present invention, since the fraction of the inventive optical fiber amplifier network subject to the full output power of the combined amplifiers is short, nonlinear parasitic effects such as Stimulated Raman Scattering (SRS), Stimulated Brillouin Scattering (SBS), and Four Wave Mixing (FWM) are relatively easy to suppress.

An object according to the present invention is to provide an optical fiber amplifier network having an output power level in excess of 100 watts. It will be appreciated that this output power level would be more than adequate for many military, medical and commercial applications.

Another object according to the present invention is to provide a frequency-doubled optical fiber amplifier network. It will be appreciated that the high quality output laser beam can be frequency doubled readily.

Still another object according to the present invention is to produce a laser amplifier having a plurality of optical fiber amplifier network modules. According to one aspect of the present invention, the disclosed network for coherently combining fiber amplifiers advantageously functions as an excellent amplifier module for a high power phased array system, such as the exemplary high power phased array systems discussed in greater detail below.

These and other objects, features and advantages according to the present invention are provided by an optical fiber amplifier which receives a primary laser beam and generates a coherent amplified laser beam, including an optical isolator which transmits the primary laser, a 3-dB coupler which receives the primary laser beam, which generates first and second laser beams, which receives first and second amplified laser beams, and which combines the amplified laser beams to thereby produce the coherent amplified laser beam, a phase controller operatively connected in parallel with the 3-dB coupler which controls the phase of each of the amplified laser beams, and first and second fiber amplifiers operatively connected to the 3-dB coupler, the fiber amplifiers receiving first and second laser beams and generating the amplified laser beams, respectively.

These and other objects, features and advantages according to the present invention are provided by an optical fiber amplifier network which receives a primary laser beam and generates a coherent amplified laser beam. Preferably, the optical fiber amplifier network includes a coupling section, which receive s the primary laser beam, which generates a plurality of secondary laser beams, which receives amplified secondary laser beams, and which combines the amplified secondary laser beams to thereby produce the coherent amplified laser beam, a control circuit, operatively connected to the coupling section, which circuit controls the phase of each of the amplified secondary laser beams, and a plurality of fiber amplifiers operatively connected to the coupling section, each of the fiber amplifiers receiving a respective one of the secondary laser beams and generating a respective one of the amplified secondary laser beams.

According to one aspect of the present invention, optical fiber amplifier network advantageously can include a frequency doubler operatively coupled to the coupling section to thereby generate a frequency doubled coherent amplified laser beam. According to another aspect of the present invention, each of the fiber amplifiers is an end-pumped fiber amplifier. Preferably, the transmissive elements in the coupling stage can be 3-dB couplers.

These and other objects, features and advantages according to the present invention are provided by a high-power laser amplifier, including a generator which generates a laser beam, a beam splitter which generates N primary laser beams from the laser beam, N optical fiber amplifier networks, each of which receives an Nth primary laser beam and generates an Nth coherent amplified laser beam, and a combiner which generates a coherent high-power laser beam by combining the N coherent amplified laser beams. Advantageously, N and M are both positive integers greater than 1. Preferably, each of the optical fiber amplifier networks includes a coupling section, which receives the Nth primary laser beam, which generates M secondary laser beams, which receives M amplified secondary laser beams, and which combines the M amplified secondary laser beams to thereby produce the Nth coherent amplified laser beam, a control circuit, operatively connected to the coupling section, which circuit controls the phase of each of the M amplified secondary laser beams, and M fiber amplifiers operatively connected to the coupling section, each of the fiber amplifiers receiving a respective one of the M secondary laser beams and generating a respective one of the M amplified secondary laser beams.

These and other objects, features and advantages according to the present invention are provided by an optical fiber amplifier network which receives a primary laser beam and generates a coherent amplified laser beam. Preferably, the optical fiber amplifier network includes an optical coupling stage including a first port for receiving the primary laser beam, second ports for generating a plurality of secondary laser beams and for receiving amplified secondary laser beams, and a third port for combining the amplified secondary laser beams to thereby produce the coherent amplified laser beam. The optical fiber amplifier network also includes a controller connected to the optical coupling stage for controlling the respective phase of each of the amplified secondary laser beams, and an amplifier coupled to the second ports for generating the amplified secondary laser beams responsive to the secondary laser beams received from the second ports.

These and other objects, features and advantages according to the present invention are provided by a high-power laser amplifier, including a generator which generates a laser beam, a beam splitter which generates N primary laser beams from the laser beam, N optical fiber amplifier networks, each of which receives an Nth primary laser beam and generates an Nth coherent amplified laser beam, and a combiner which generates a coherent high-power laser beam by combining N coherent amplified laser beams output by the N optical fiber amplifier networks, where N is a positive integer greater than 1. Preferably, each of the optical fiber amplifier networks includes an optical isolator which receives one of the N primary laser beams, generates a respective secondary laser beams, and prevents application of the secondary laser beam to at least one of the generator and the beam splitter, an optical coupling device including a first port for receiving the secondary laser beam, second ports for generating a plurality of tertiary laser beams and for receiving amplified tertiary laser beams, and a third port for combining the amplified tertiary laser beams to thereby produce a coherent amplified laser beam, a controller connected to the optical coupling device for controlling the respective phase of each of the amplified tertiary laser beams, and an amplifier for generating the amplified tertiary laser beams received by the second ports responsive to the tertiary laser beams. According to one aspect of the invention, the amplifier is an end pump fiber amplifier, with the pump source connected to the first end of an optical fiber bundle and the second ports connected to the opposite end of the optical fiber bundle.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 4 is a high-level block diagram of selected components of a previously proposed fiber optic amplifier which advantageously can employ the optical fiber amplifier network illustrated in FIG. 1.

DETAILED DESCRIPTION OF THE PREFERRED EMBODIMENTS

The optical fiber amplifier network, which preferably combines the output of a plurality of optical fiber amplifiers based on classic 3-dB fiber optic couplers, will now be described while referring to FIG. 1. It should be mentioned that the optical fiber amplifier network according to the present invention is an injection locked optical fiber amplifier network, which permits the network to be locked onto any selected gain line.

Figure 1:
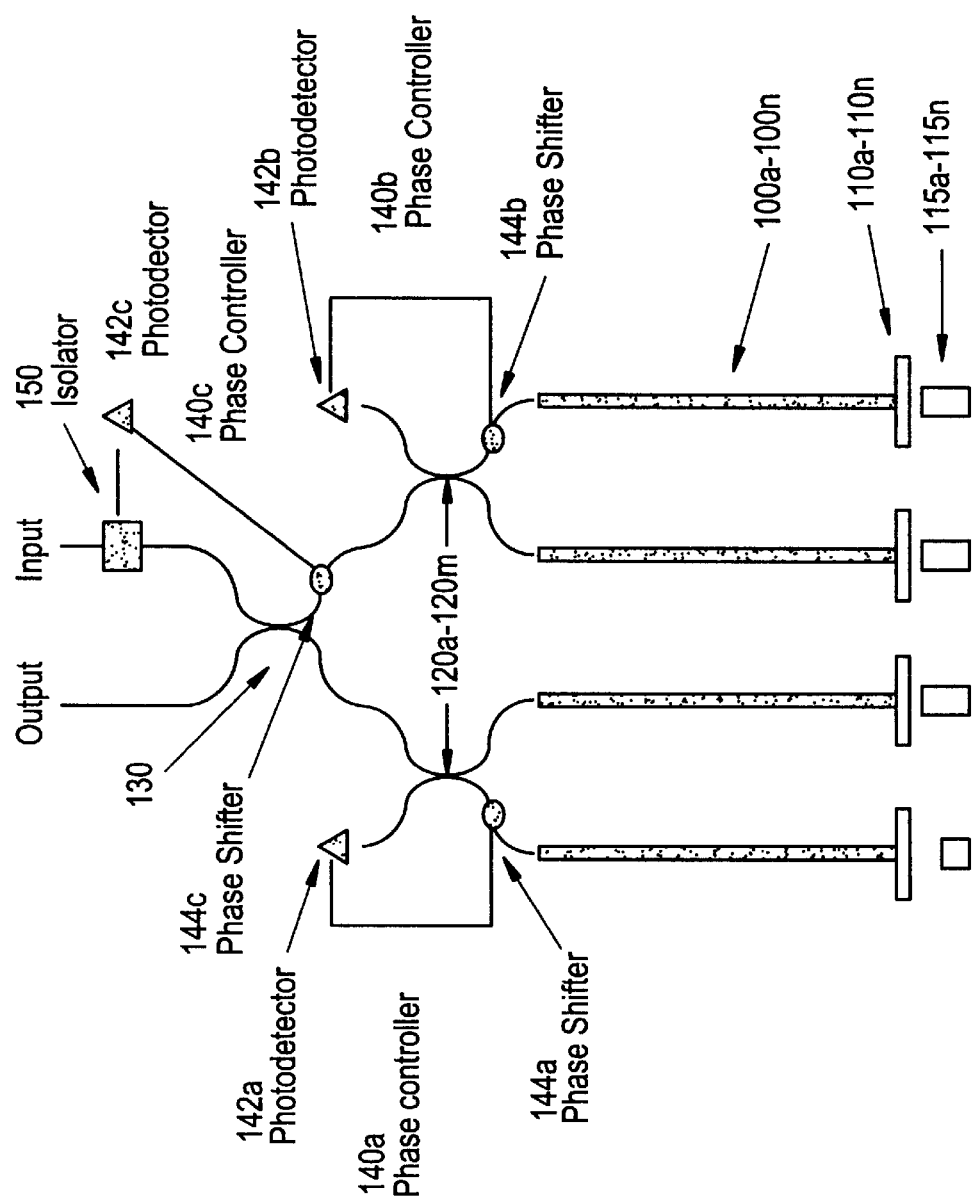
FIG. 1 is an optical fiber amplifier network according to the present invention.

As illustrated in FIG. 1, the optical fiber amplifier network includes a plurality of fiber amplifiers 100a–100n, each of which is coupled at its first end to a coupling element 110a–110n, respectively, and at its second end to one port 122a–122n (not shown) of one of the 3-dB optic couplers 120a–120m. It will be noted that m and n are both integers and that m is equal to (n/2). Preferably, the coupling elements 110a–110n are reflective mirrors, e.g., half mirrors, which couple respective pump radiation from laser diode elements 115a–115n; most preferably, coupling elements 110a–110n are gratings, e.g., Bragg gratings, for coupling pump radiation occupying a predetermined bandpass region from the laser diode elements 115a–115n into the fiber amplifiers 100a–100n. It will be appreciated that each laser diode element advantageously can include more than one laser diode.

The optic couplers 120a–120m preferably are connected to an outer optic coupler 130. It will be appreciated that, in the exemplary case, two stages of optic coupling devices are needed to couple the input laser beam to the four fiber amplifiers. It will also be appreciated that the number of optic coupling devices serially connected to one another increases as the number of fiber amplifiers increases. In short, there are N stages required for coupling $2^N$ fiber amplifiers. However, while the optical fiber amplifier network can be expanded to include any $2_N$ fiber amplifiers, it should be noted that the optimal number of fiber amplifiers in an optical fiber amplifier network module is four fiber amplifiers. From FIG. 1, it will be appreciated that it requires three 3-dB couplers to connect four fiber amplifiers; to expand the optical fiber amplifier network to 16 fiber amplifiers require 15 3-dB couplers. However, a power amplifier having 16 fiber amplifiers can be achieved using the arrangement illustrated in FIG. 2, i.e., using just 12 3-dB couplers.

Each of the optic couplers 120a–120m and 130 have associated therewith a phase control system for controlling the phase of the laser beam at one of the ports of the optic couplers. For example, the phase control system 140a associated with optic coupler 120a advantageously can include a photodiode 142a, which generates an electrical signal indicative of the phase of the respective impinging laser beam. This signal, e.g., Sa, is applied to an electro optical phase shifter 144a, which controls the phase of the laser beam output by optic coupler 120a. Alternatively, the phase shifter advantageously can be another type of phase shifting device, e.g., a thermooptic phase shifting element. Other possibilities, such as piezoelectric phase shifters, will become readily apparent to one of ordinary skill in the art, and all such variations are considered to be within the scope of the present invention.

It will be appreciated, from inspection of FIG. 1, that the output optic coupler 130 is connected so as to receive an input laser beam and to output an amplified laser beam and, thus, there is no convenient port to which a photodiode 142c of phase control system 140c can be coupled. However, the input laser beam to output optic coupler 130 is routed to one port of the optic coupler via an optical isolator 150, which, in an exemplary case, advantageously can be a Faraday optical isolator. It will be appreciated that the photodiode 142c beneficially can be connected to receive a portion of the input laser beam; thus, a phase reference signal Sr can be generated by photodiode 142c, which signal can be beneficially applied to a phase shifter 144c so as to permit phase control of the laser beams coupled to the optic couplers 120a–120m. It will be appreciated that the phase shifter 144c advantageously can be identical to phase shifters 144a–144m. Moreover, it will be appreciated that the components including optical isolator 150 and photodiode 142c beneficially can be configured to generate the signal Sr responsive to either a portion of the input laser beam coupled into the optical fiber amplifier network or a portion of the input laser beam which is not coupled to the optical fiber amplifier network.

The operation of the optical fiber amplifier network will now be described with reference to FIG. 1. The input signal, i.e., the input laser beam, to be amplified is divided by a network of N fiber optic couplers 120–12m, the outputs of which are then coupled into one end of $2_N$ high power diode pumped fiber amplifiers 100a–100n. Preferably, the end of the fiber amplifiers 100a–100n distal to the input end is coated both for high reflectivity at the signal wavelength and for high transmission at the optical pumping wavelengths. Thus, the input signal is provided to each of the optical fiber amplifiers 100a–100n. It should be mentioned here that the optical fiber comprising the fiber amplifiers advantageously can be either a dual core rare-earth-doped fiber or single mode fibers pumped by high brightness single mode laser diode pumps. It will be appreciated that the signal injected at the optical isolator 150 propagates to the distal end of each of the fiber amplifiers 100a–100c, and is reflected back to the output optical coupler 130, thus making a double pass through each fiber section. The signal is thus amplified and returned to the fiber coupler network, i.e., optic couplers 120a–120m and 130.

It should be noted that when the phase is adjusted properly at any of the phase shifters 144a–144c, the amplified signals will be combined for transmission to the next optic coupler stage without loss, where the lossless combination can be repeated again. At the output optic coupler 130, the phase advantageously can be adjusted by the control loop 140c so that all of the power contained in the input laser beam is directed to the output port rather than back into the input port, i.e., the port connected to the optical isolator 150.

Preferably, the phase adjustments are made by sensing the power coming out of the ports as indicated in FIG. 1, and adjusting the phase to thereby maximize or minimize the output power of the respective signal, as required.

It will also be noted that the power out of the output port of the output optic coupler 130 is N times the power produced by any single fiber amplifier, e.g., fiber amplifier 100a, minus combining losses. Since only the optical fiber downstream of the output optic coupler 130, i.e., at the output port of the output optic coupler 130, is required to transmit the maximum generated power, the output power of the optical fiber amplifier network is limited by the power rating of one of the output optic coupler 130 and the single output optical fiber 160, whichever is less. It will be appreciated that the lengths of optical fiber used in fabricating fiber amplifiers 100a–100n advantageously are limited to 1/N times the power rating of the limiting component in the optical fiber amplifier network.

Advantageously, since only the optical fiber downstream of the output optic coupler 130, i.e., at the output port of the output optic coupler 130, is required to transmit the maximum generated power, this configuration of the optical fiber amplifier network reduces the tendency for nonlinear parasitics to exceed threshold and become a problem. Thus, a 100-watt amplifier module advantageously can be fabricated using only 25 watt fiber amplifiers 100a–100d, which, it will be noted, are essentially state-of-the-art at present.

From the discussion above, it will be appreciated that the optical fiber amplifier network according to the present invention is relatively straightforward. The optical fiber amplifier network advantageously permits rapid and parallel phase adjustments between fiber amplifiers to enable coherent combining of their output signals. Moreover, the fiber amplifiers 100a–100n are readily end pumped in a simple geometrical configuration. It will be noted that since the fraction of the fiber network subject to the full output power of all of the fibers amplifiers is small, nonlinear parasitic effects such as Stimulated Raman Scattering (SRS), Stimulated Brillouin Scattering (SBS), and Four Wave Mixing (FWM) can be readily suppressed.

It should be mentioned that the power level achievable by the optical fiber amplifier network is easily scalable to output power in excess of 100 watts, although 100 watts is more than adequate for many military, medical and commercial applications. When the desired power output exceeds 100 watts, a plurality of optical fiber amplifier networks advantageously can be employed as modules within a laser power amplifier. Furthermore, the high quality beam produced by the optical fiber amplifier network can be frequency doubled readily. Thus, the coherent optical fiber amplifier network according to the present invention also provides an excellent amplifier module design for a high power phased array laser amplifier system as described in the applications cited and discussed throughout this specification.

It should be mentioned that some conventional components that are understood to be part of any practical fiber optic laser system have been omitted from the drawings and detailed description of the preferred embodiments of the present invention so as not to obscure the fundamental features of the invention. The details of such components are well known to those skilled in the art and will not be discussed further.

As discussed above, a plurality of optical fiber amplifier networks advantageously can be combined to produce a high-power laser amplifier. It will be appreciated that a considerable amount of effort has been expended in designing and fabricating high-power systems which are capable of scaling-up output power. This quest has been the subject of several recent patent applications, i.e., Ser. Nos. 08/471,870, 08/611,474, 08/782,175, 08/783,009, and 08/800,296, which applications are commonly assigned, and which applications are incorporated herein by reference for all purposes.

An exemplary high-power laser amplifier will be described immediately below with reference to FIG. 2. However, it should be mentioned that the alternative high power laser amplifier configurations illustrated in the above-mentioned patent applications advantageously can be adapted to employ the optical fiber amplifier network pictured in FIG. 1 and all such variations, and combinations of these variations, are also considered to be within the scope of the present invention. In other words, high-power fiber amplifiers advantageously including elements from at least one of the above-identified applications and the novel optical fiber amplifier network according to the present invention are considered to be within the scope of the present invention.

Figure 2:
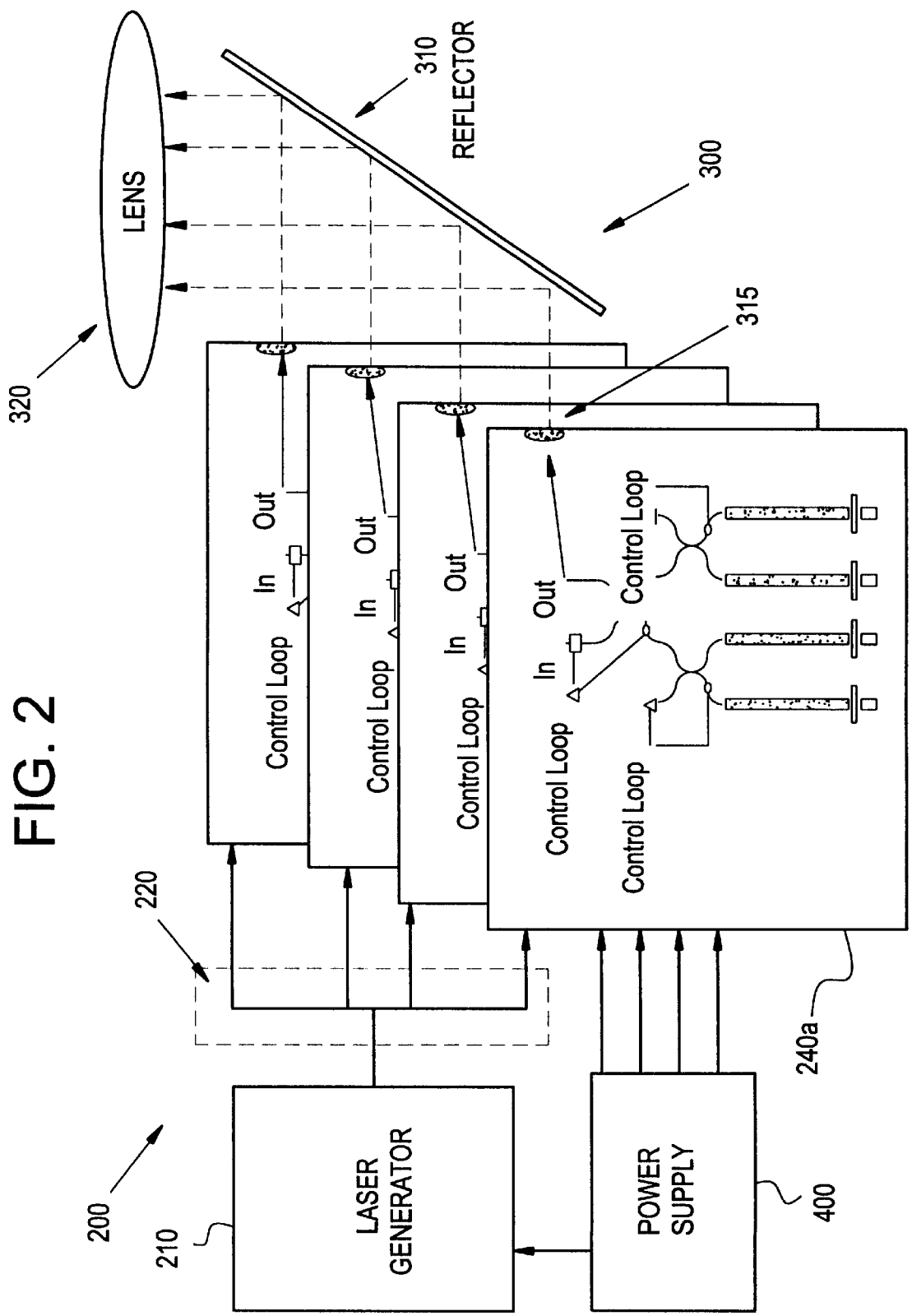
FIG. 2 is a high-level block diagram of selected components of a laser amplifier fabricated using a plurality of the optical fiber amplifier networks illustrated in FIG. 1.

The high power laser amplifier 200 illustrated in FIG. 2, advantageously includes a laser generator 210, which generates a primary laser beam, a beam splitter section 220, which generates a plurality of secondary laser beams responsive to the primary laser beam, and a respective plurality of optical fiber amplifier networks 240a–240r, which amplify the secondary laser beams to produce aa plurality of amplified laser beams. In addition, an optical element section 300, which collects and combines the amplified laser beams and a power supply 400, which powers the laser generator 210 and the optical fiber amplifier networks 240a–240r, are also included in the laser amplifier 200.

Preferably, the number R of optical fiber amplifier networks 240 can be varied as required to provide a desired output power of the high power laser amplifier 200. In the exemplary case illustrated in FIG. 2, four optical fiber amplifier networks 240a–240d are provided with electrical power, primarily for powering the pump diodes 115a–115n and phase shifters 140a–140m(See FIG. 1), from power supply 400. From FIG. 2, it will be apparent that the respective amplified laser beams generated by optical fiber amplifier networks 240a–240d are coupled to a condensing lens 320 via output optical elements 315a–315d and a beam combiner 310. Advantageously, the beam combiner 310 can be a simple reflector, thus permitting the amplified laser beams to be transmitted in free space and, thus, avoiding problems associated with the power dissipation characteristics of the optical fibers used in the power amplifier 200. In short, since the power limited element in each optical fiber amplifier network will generally be the optical fiber downstream of the output optic coupler 130, optimal designs minimize the use of such optical fiber.

Figure 3:
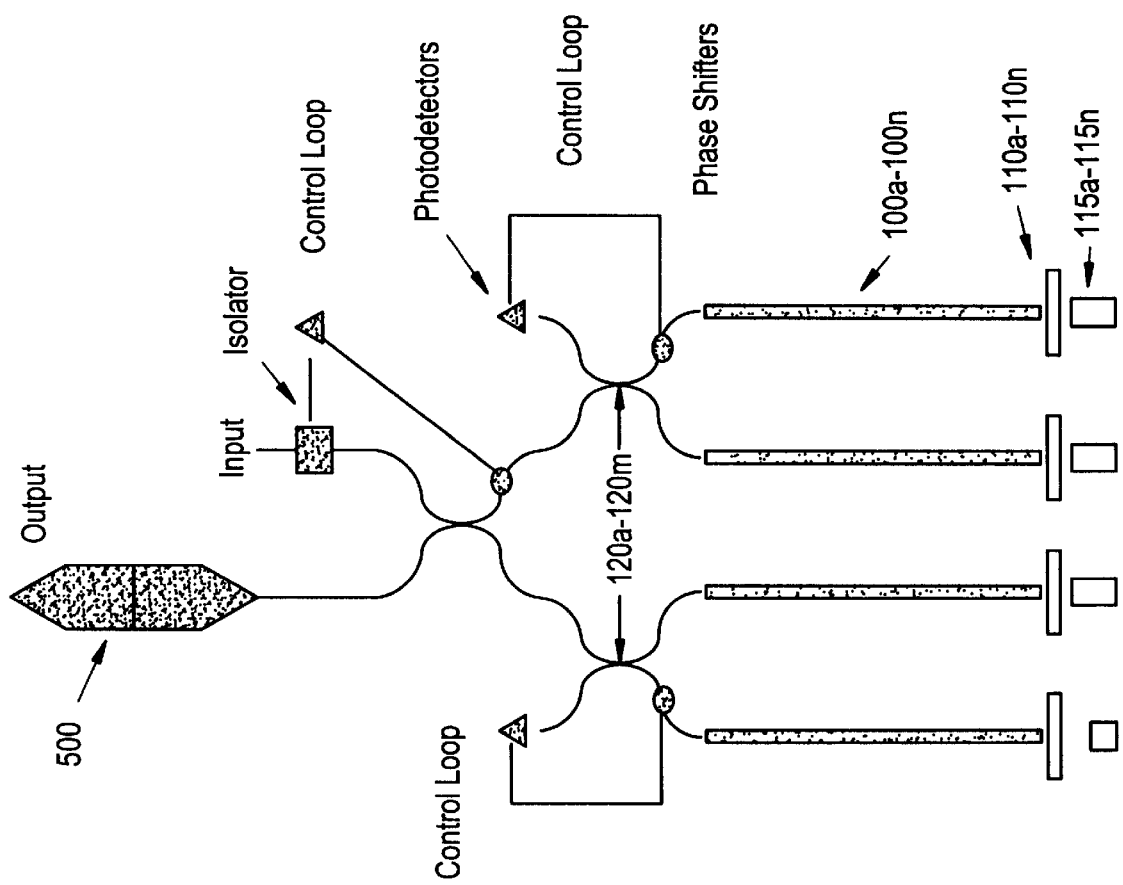
FIG. 3 is a schematic diagram of a frequency-doubled laser amplifier employing the optical fiber amplifier network illustrated in FIG. 1.
Figure 5A:
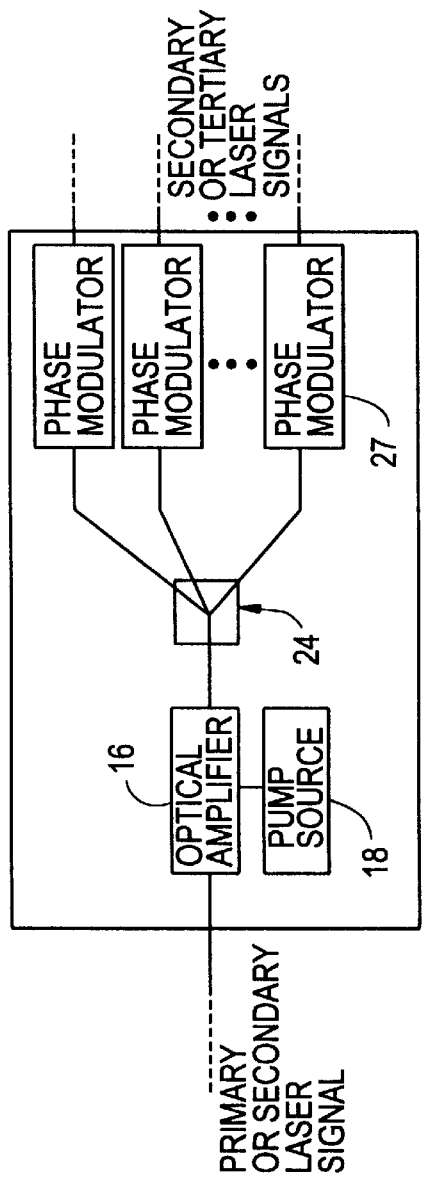
FIG. 5a–5c illustrate alternatively proposed configurations of selected optical fiber elements employed in a high power coherent laser amplifier.
Figure 5C:
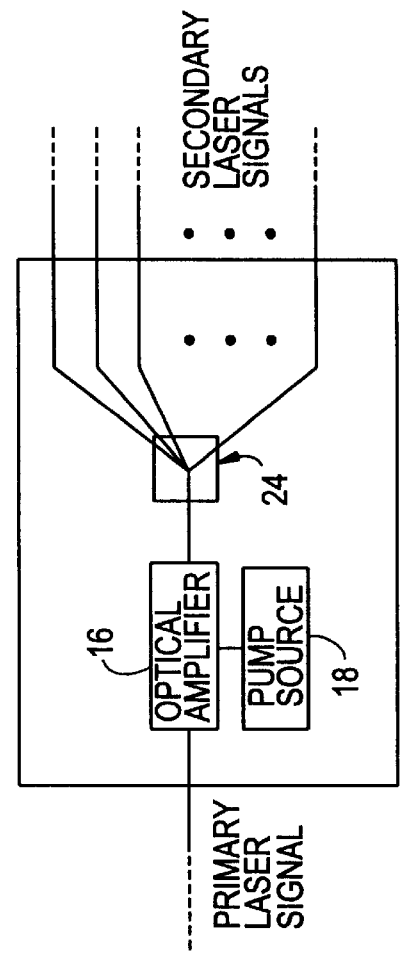
Figure 5B:
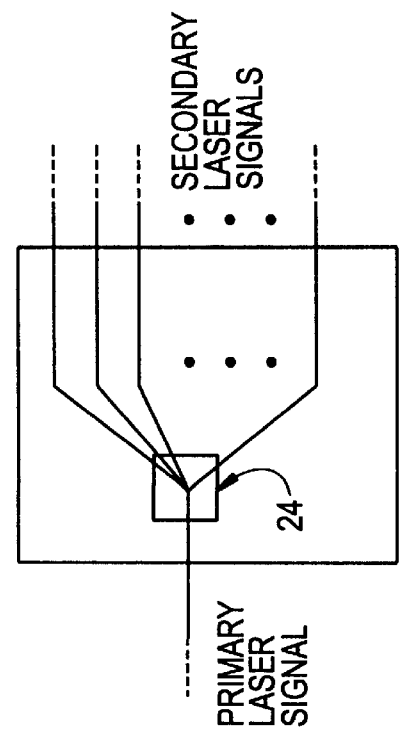

A second alternative preferred embodiment according to the present invention, i.e., a frequency doubled optical fiber amplifier network, is illustrated in FIG. 3. Preferably, the major distinction between the optical fiber amplifier network of FIG. 1 and the frequency-doubled optical fiber amplifier network of FIG. 3 is the addition of frequency doubler 500 downstream of output optic coupler 130. It will be appreciated that the frequency doubler 500 advantageously can include a nonlinear optical element as well as input and output optical elements (not shown) for coupling the output laser beam into and out of the nonlinear optical element. The frequency doubling function can be provided by the doubling crystal 500, which crystal advantageously can be any nonlinear crystal, such as Lithium Niobate or potassium titanyl phosphate (KTP). It will be appreciated that polarized laser light is coupled into the doubling crystal 500 by a focusing optical element (not shown), while frequency doubled laser light is coupled to downstream optical elements by an output coupler element (also not shown). It will be appreciated that such elements and the arrangement thereof are well known to one of ordinary skill in the art and, for that reason, will not be discussed further.

It will be appreciated from the description of the preferred embodiments that the present invention, i.e., the optical fiber amplifier network, offers several distinct advantages in medical, industrial, and military applications. For example, the optical fiber amplifier network illustrated in FIG. 1 advantageously can be employed as a single module in a high power phased array for a weapon system or as an element of a high power sensor in microdoppler ladar system applications, as taught in the above-identified applications discussed above. Moreover, it will be appreciated that the novel optical fiber amplifier network can be used in such diverse applications as printers, medical lasers, ladar sources, and sources for frequency doubled applications, e.g., laser projectors.

Thus, the novel features of an optical fiber amplifier network according to the present invention include a structure which coherently combines the signals from multiple fiber amplifiers in a way that multiplies the power available in a single mode. Moreover, the optical fiber amplifier network allows each fiber amplifier to be end pumped from one end while the signal to be amplified is injected into the other end. It should be noted that the architecture employed in the optical fiber amplifier network doesn't required lossy obstructions, e.g., dichroic beam splitters or polarizers, which elements would otherwise be required to insert the signal and pump power from the same end.

As mentioned above, in the optical fiber amplifier network according to the present invention, since the highest power does not occur in the amplifiers, nonlinear parasitics are easily controlled. Moreover, the high output beam quality lends itself to driving nonlinear devices such as frequency doublers or optical parametric oscillators. Advantageously, all phase adjustments in the optical fiber amplifier network can be performed locally with simple closed loop control systems across each optic coupler stage.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. An optical fiber amplifier which receives a primary laser beam and generates a coherent amplified laser beam, comprising:

an optical isolator which transmits the primary laser;

a 3-dB coupler which receives the primary laser beam, which generates first and second laser beams, which receives first and second amplified laser beams, and which combines said amplified laser beams to thereby produce the coherent amplified laser beam;

a phase controller operatively connected in parallel with said 3-dB coupler which controls the phase of each of said amplified laser beams; and first and second fiber amplifiers operatively connected to said 3-dB coupler, said fiber amplifiers receiving said first and second laser beams and generating said amplified laser beams, respectively.

2. An optical fiber amplifier network which receives a primary laser beam and generates a coherent amplified laser beam, comprising:

a coupling section, which receives the primary laser beam, which generates a plurality of secondary laser beams, which receives amplified secondary laser beams, and which combines said amplified secondary laser beams to thereby produce the coherent amplified laser beam;

a control circuit, operatively connected to said coupling section, which circuit controls the phase of each of said amplified secondary laser beams; and a plurality of fiber amplifiers operatively connected to said coupling section, each of said fiber amplifiers receiving a respective one of said secondary laser beams and generating a respective one of said amplified secondary laser beams.

3. The optical fiber amplifier network as recited in claim 2, further comprising a frequency doubler operatively coupled to said coupling section to thereby generate a frequency doubled coherent amplified laser beam.

4. The optical fiber amplifier network as recited in claim 2, further comprising a Faraday isolator which transmits the primary laser beam in response to reception of an incoming laser beam.

5. The optical fiber amplifier network as recited in claim 2, wherein:

each of said fiber amplifiers is an end-pumped fiber amplifier comprising:
an optical fiber having first and second ends and having a predetermined gain characteristic;
a laser diode which generates pump radiation; and
a coupling element which couples said pump radiation into said optical fiber;
said coupling element is optically disposed between said first end of said optical fiber and said laser diode; and
said second end of said optical fiber is optically coupled to said coupling section.

6. The optical fiber amplifier network as recited in claim 5, wherein said coupling element comprises a Bragg grating.

7. The optical fiber amplifier network as recited in claim 2, wherein said coupling stage comprises:

a first 3-dB coupler having first and second ends: and
a plurality of second 3-dB couplers having first and second ends;
wherein said first end of said first 3-dB coupler receives said primary laser beam and outputs the coherent amplified laser beam;
wherein said second end of said second 3-dB couplers generate said secondary laser beams and receive said amplified secondary laser beams; and
wherein said second end of said first 3-dB coupler is optically coupled to said first end of said second 3-dB couplers.

8. The optical fiber amplifier network as recited in claim 7, wherein said control circuit comprises:

a sensor which generates a control signal indicative of laser beam phase at a predetermined location in said coupling section; and
a phase shifter which is separated from said sensor by a selected one of said first 3-dB coupler and one of said second 3-dB couplers and which varies laser beam phase responsive to said control signal.

9. A high-power laser amplifier, comprising:
a generator which generates a laser beam;

a beam splitter which generates N primary laser beams from said laser beam;

N optical fiber amplifier networks, each of which receives an Nth primary laser beam and generates an Nth coherent amplified laser beam, each of said optical fiber amplifier networks comprising:

a coupling section, which receives said Nth primary laser beam, which generates M secondary laser beams, which receives M amplified secondary laser beams, and which combines said M amplified secondary laser beams to thereby produce said Nth coherent amplified laser beam;

a control circuit, operatively connected to said coupling section, which circuit controls the phase of each of said M amplified secondary laser beams; and M fiber amplifiers operatively connected to said coupling section, each of said fiber amplifiers receiving a respective one of said M secondary laser beams and generating a respective one of said M amplified secondary laser beams; and a combiner which generates a coherent high-power laser beam by combining said N coherent amplified laser beams, wherein N and M are both positive integers greater than 1.

10. The high-power laser amplifier as recited in claim 9, further comprising a frequency doubler operatively coupled to said combiner to thereby generate a frequency doubled coherent high-power laser beam.

11. The high-power laser amplifier as recited in claim 9, wherein:

each of said M fiber amplifiers in said N optical fiber amplifier networks comprises an end-pumped fiber amplifier including:
an optical fiber having first and second ends and having a predetermined gain characteristic;
a laser diode which generates pump radiation; and
a coupling element which couples said pump radiation into said optical fiber;
said coupling element is optically disposed between said first end of said optical fiber and said laser diode; and
said second end of said optical fiber is optically coupled to said coupling section.

12. The high-power laser amplifier as recited in claim 11, wherein said coupling element comprises a Bragg grating.

13. The high-power laser amplifier as recited in claim 9, wherein each said coupling stage of said N optical fiber amplifier networks comprises:

an Nth 3-dB coupler having first and second ends: and
R secondary 3-dB couplers having first and second ends;
wherein said first end of said Nth 3-dB coupler receives said Nth primary laser beam and outputs said Nth coherent amplified laser beam;
wherein said second end of said secondary 3-dB couplers generate said R secondary laser beams and receive R said amplified secondary laser beams; and
wherein said second end of said Nth 3-dB coupler is optically coupled to said first end of said secondary 3-dB couplers,
where R is a positive integer greater than 1.

14. The high-power laser amplifier as recited in claim 13, wherein each said control circuit in said N optical fiber amplifier networks comprises:

a sensor which generates a control signal indicative of laser beam phase at a predetermined location in a respective said coupling section; and a phase shifter which is separated from said sensor by a selected one of said Nth 3-dB coupler and one of said secondary 3-dB couplers and which varies laser beam phase responsive to said control signal.

15. An optical fiber amplifier network which receives a primary laser beam and generates a coherent amplified laser beam, comprising:

means for coupling including:
      first means for receiving the primary laser beam;
      second means for generating a plurality of secondary laser beams;
      third means for receiving amplified secondary laser beams; and
      fourth means for combining said amplified secondary laser beams to thereby produce the coherent amplified laser beam;
   means for controlling the respective phase of each of said amplified secondary laser beams, said controlling means being operatively coupled to said coupling means; and
   means for generating said amplified secondary laser beams received by said third means responsive to receipt of said secondary laser beams from said second means, said generating means being optically coupled to said coupling means at said second and third means.

16. The optical fiber amplifier network as recited in claim 15, further comprising a frequency doubler operatively coupled to said coupling means to thereby generate a frequency doubled coherent amplified laser beam responsive to the coherent amplified laser beam.

17. The optical fiber amplifier network as recited in claim 15, wherein said generating means comprises:

N end pumped optical fiber amplifiers;
   N laser diodes which generate pump radiation; and
   N coupling elements which couple N packets of said pump radiation into said N optical fiber amplifiers, respectively, wherein each of said N coupling elements is optically disposed between one of said N optical fiber amplifiers and one of said N laser diodes, and
   wherein N coupling elements are optically separated from said coupling means by said N optical fiber amplifiers.

18. The optical fiber amplifier network as recited in claim 17, wherein said N coupling elements each comprise a Bragg grating.

19. The optical fiber amplifier network as recited in claim 15, wherein said coupling means comprises:

a first 3-dB coupler having first and second ends: and
   a plurality of second 3-dB couplers having first and second ends;
   wherein said first end of said first 3-dB coupler receives said primary laser beam and outputs the coherent amplified laser beam;
   wherein said second end of said second 3-dB couplers generate said secondary laser beams and receive said amplified secondary laser beams; and
   wherein said second end of said first 3-dB coupler is optically coupled to said first end of said second 3-dB couplers.

20. The optical fiber amplifier network as recited in claim 19, wherein said controlling means comprises:

a sensor which generates a control signal indicative of laser beam phase at a predetermined location in said coupling means; and
   a phase shifter separated from said sensor by a selected one of said first 3-dB coupler and one of said second 3-dB couplers which varies laser beam phase responsive to said control signal.

21. The optical fiber amplifier network as recited in claim 15, further comprising a Faraday Isolator which transmits the primary laser beam in response to reception of an incoming laser beam.

22. A high-power laser amplifier, comprising:

a generator which generates a laser beam;
   a beam splitter which generates N primary laser beams from said laser beam;
   N optical fiber amplifier networks, each of which receives an Nth primary laser beam and generates an Nth coherent amplified laser beam, each of said optical fiber amplifier networks comprising:
      isolator means, receiving one of said N primary laser beams for generating a secondary laser beams and preventing application of said secondary laser beam to at least one of said generator and said beam splitter;
      means for coupling including:
         first means for receiving said secondary laser beam;
         second means for generating a plurality of tertiary laser beams;
         third means for receiving amplified tertiary laser beams; and
         fourth means for combining said amplified tertiary laser beams to thereby produce a coherent amplified laser beam;
      means for controlling the respective phase of each of said amplified tertiary laser beams, said controlling means being operatively coupled to said coupling means; and
      means for generating said amplified tertiary laser beams received by said third means responsive to receipt of said tertiary laser beams from said second means, said generating means being optically coupled to said coupling means at said second and third means; and
   a combiner which generates a coherent high-power laser beam by combining N coherent amplified laser beams output by said N optical fiber amplifier networks,
   wherein N is a positive integer greater than 1.

23. The high-power laser amplifier as recited in claim 22, wherein said generating means comprises:

M end pumped optical fiber amplifiers;
   M laser diodes which generate pump radiation; and
   M coupling elements which couple M packets of said pump radiation into said M optical fiber amplifiers, respectively, wherein each of said M coupling elements is optically disposed between one of said M optical fiber amplifiers and one of said M laser diodes, and
   wherein said M coupling elements are optically separated from said coupling means by said M optical fiber amplifiers,
   wherein M is a positive integer greater than 1.

24. The high-power laser amplifier as recited in claim 22, wherein each said coupling means in said N optical fiber amplifier networks comprises:

a first 3-dB coupler having first and second ends: and
   a plurality of second 3-dB couplers having first and second ends;
   wherein said first end of said first 3-dB coupler receives said secondary laser beam and outputs the coherent amplified laser beam;

wherein said second end of said second 3-dB couplers generate said tertiary laser beams and receive said amplified tertiary laser beams; and wherein said second end of said first 3-dB coupler is optically coupled to said first end of said second 3-dB couplers.

25. The high-power laser amplifier as recited in claim 22, wherein each said controlling means in said N optical fiber amplifier networks comprises:

a sensor which generates a control signal indicative of laser beam phase at a predetermined location in said coupling means; and a phase shifter which is separated from said sensor by a selected one of said first 3-dB coupler and one of said second 3-dB couplers and which varies laser beam phase responsive to said control signal.

* * * * *